July 11, 1967 R. E. MUELLER ETAL 3,330,988
INSTRUCTIONAL OSCILLOSCOPE
Filed Oct. 19, 1962 4 Sheets-Sheet 1
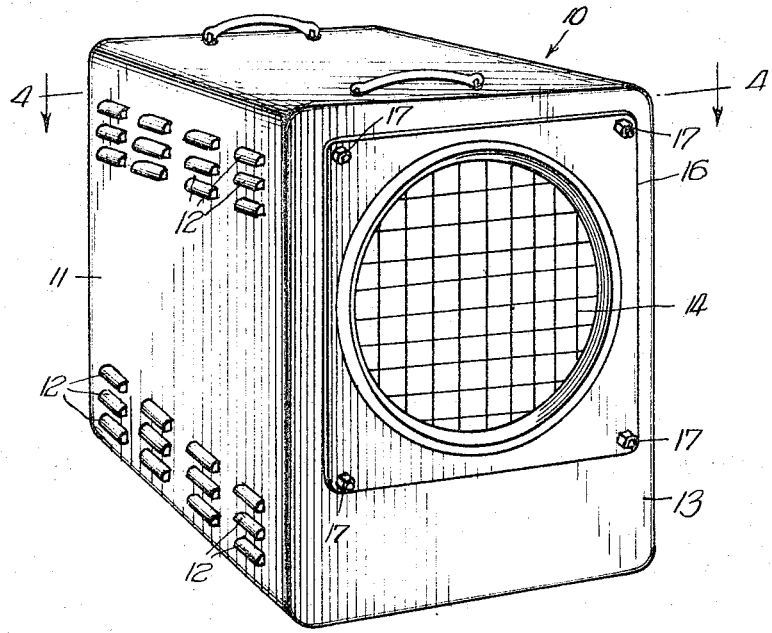
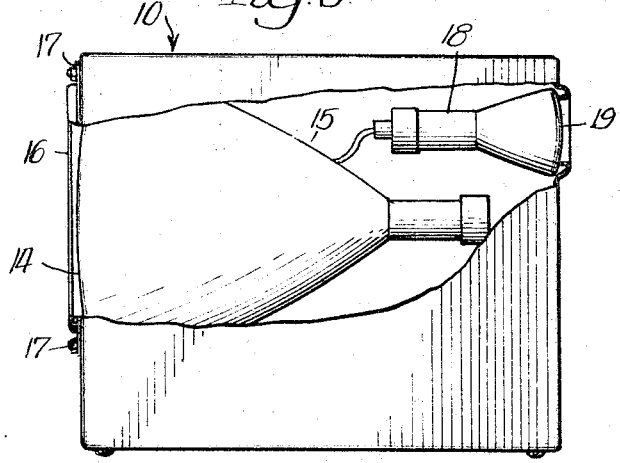
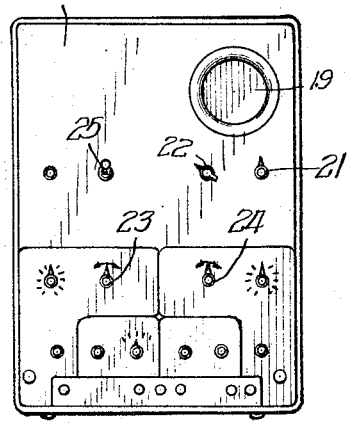
INVENTORS.
Richard E. Mueller,
Carl F. Richter,
William D. Schlesinger,
By Cromwell, Greist + Warden
Attys

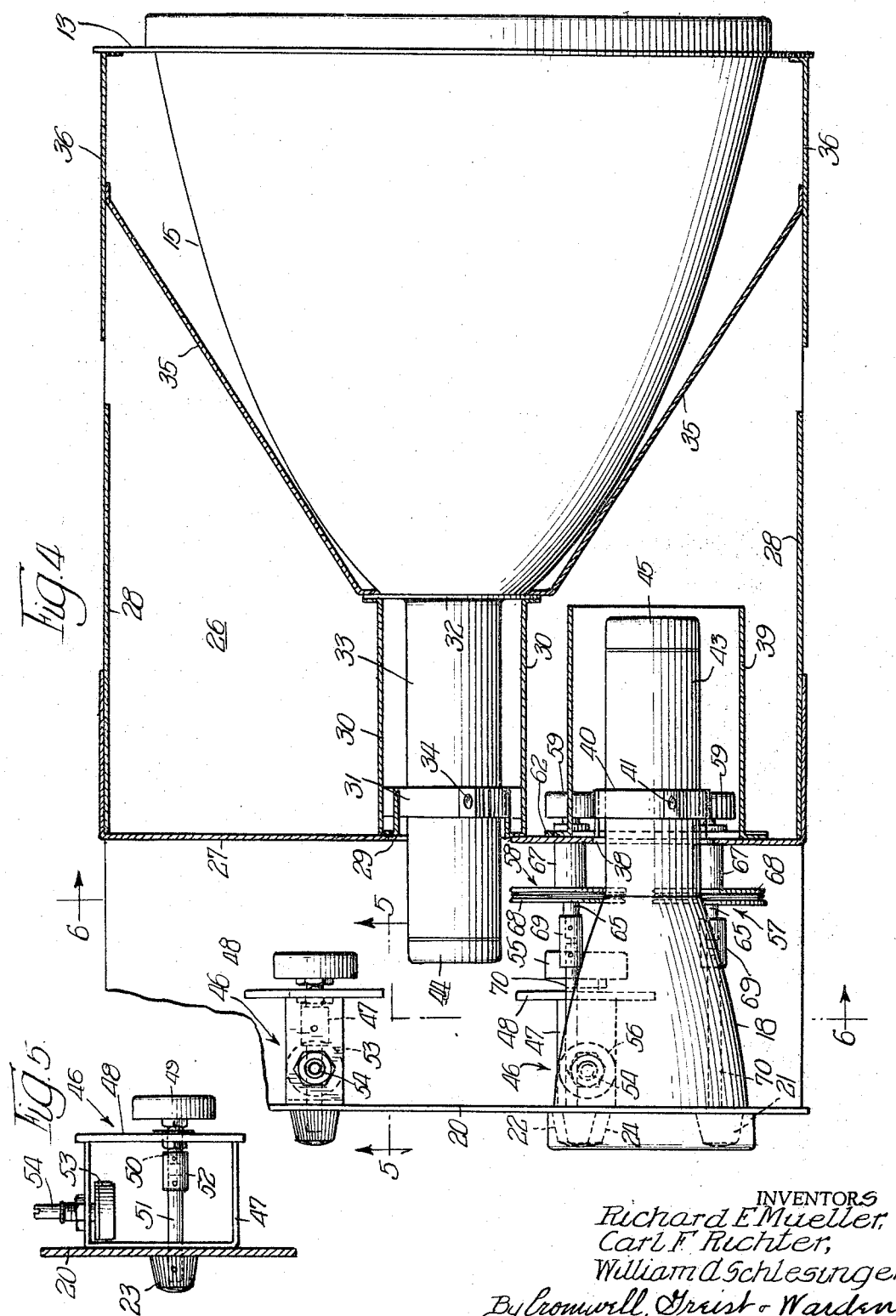

July 11, 1967  R. E. MUELLER ETAL  3,330,988
INSTRUCTIONAL OSCILLOSCOPE
Filed Oct. 19, 1962  4 Sheets-Sheet 3

INVENTORS
Richard E. Mueller,
Carl F. Richter,
William A. Schlesinger,
By Cromwell, Greist & Warden
Attys

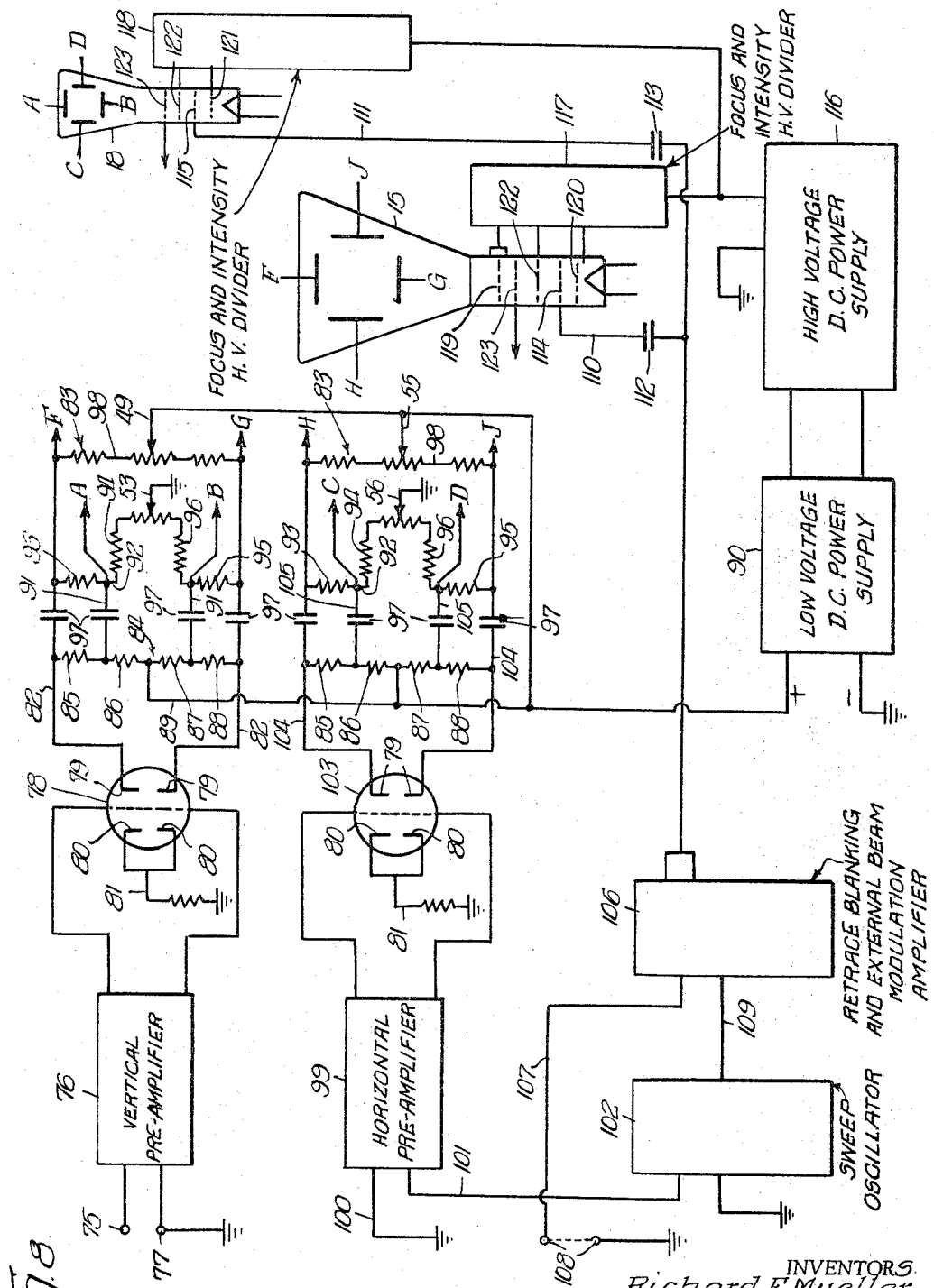

United States Patent Office 3,330,988
Patented July 11, 1967

3,330,988
INSTRUCTIONAL OSCILLOSCOPE
Richard E. Mueller and Carl F. Richter, Chicago, and William A. Schlesinger, Evanston, Ill., assignors to The Welch Scientific Company, Chicago, Ill., a corporation of Illinois
Filed Oct. 19, 1962, Ser. No. 231,736
9 Claims. (Cl. 315—9)

This invention is directed to a new and improved form of oscilloscope including a plurality of viewing screens of different size and operational characteristics, new and improved operational control circuit means for identical simultaneous operation of the plural screens, and a special control interlocking and mounting arrangement permitting simultaneous control of the screens through use of single operating means.

Instructional oscilloscopes often utilize a relatively large single 12 inch screen cathode ray tube mounted in a suitable casing or housing and exposed along the front face of the housing with the control knobs available to the instructor through the rear face of the housing. Instructional use of an oscilloscope unit of this type requires the instructor to either take a position adjacent the viewing screen and rely on blind operation of the controls or take a position behind the unit thus preventing ready observance of display variations occurring on the screen during operation of the unit. Utilization of a pair of similar units, one for ready observation by the instructor, is not economically practical nor can it be expected that each separately operated oscilloscope will function in exactly the same manner.

Combining of a pair of cathode ray tubes, either of similar or dissimilar size, in a single control circuit has not been practiced due to operational difficulties experienced with regard to simultaneous identical display control of the tubes. Expected difficulties take into consideration the uncontrollably different operational characteristics of cathode ray tubes, even those tubes of identical size and ratings. Additionally, no adequate means for properly balancing or offsetting different operational characteristics of the components of a multiple tube operating circuit has been devised. Circuit component impedance balancing and electrical and mechanical coupling of multiple controls, as is necessary for the simultaneous identical operation of a plurality of cathode ray tubes, have been considered unfeasible both from an engineering and economic standpoint. These problems are further accentuated by any attempt to operatively couple a plurality of cathode ray tubes of different screen size.

It is an object of the present invention to provide a new and improved oscilloscope unit utilizing a plurality of cathode ray tubes electrically and mechanically interrelated for simultaneous identical operation.

A further object is to provide a new and improved instructional oscilloscope incorporating therein a pair of oppositely facing cathode ray tubes of different size with the larger tube being readily observable from one end of the unit for class consideration and the smaller tube being readily observable from the opposite end of the unit and in direct association with a consolidated control panel, both the smaller tube and control panel being readily observable and accessible to the instructor.

Another object is to provide an instructional oscilloscope including a pair of diversely directed viewing tubes operating at different voltages, and special single circuit operating means for both the tubes including electrically and mechanically integrated tube display control means for simultaneous control of identical operation of the tubes.

A further object is to provide a new and improved circuit for electrically coupling and simultaneously operating a pair of cathode ray tubes, the tubes each requiring different controlled operating conditions.

Other objects not specifically set forth will become apparent from the following detailed description of the invention made in conjunction with the accompanying drawings wherein:

FIG. 1 is a perspective view of the instructional oscilloscope device from the front thereof;

FIG. 2 is a rear end elevation of the device illustrating the viewing screen of the smaller tube and the control panel;

FIG. 3 is a fragmentary side elevation of the device schematically illustrating the arrangement of the two cathode ray tubes therein;

FIG. 4 is an enlarged fragmentary top plan section of the device as viewed generally along line 4—4 in FIG. 1;

FIG. 5 is a partly sectioned side elevational view of one of the control means of the device taken generally along line 5—5 in FIG. 4;

FIG. 8 is a schematic wiring diagram of the control circuit of the device.

Figures 6, 7:
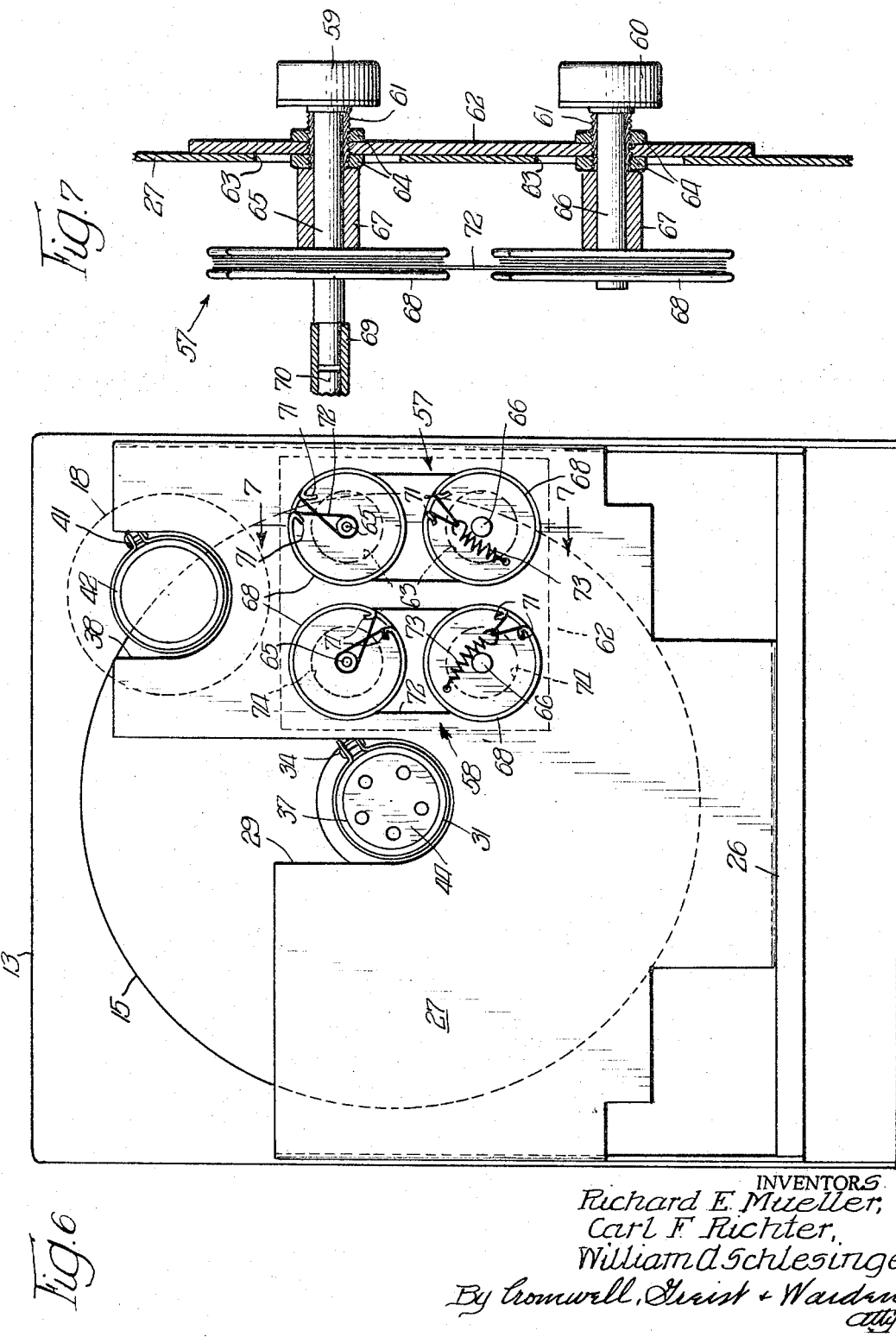
FIG. 6 is a partly sectioned transverse view of the device taken generally along line 6—6 in FIG. 4.
FIG. 7 is an enlarged partly sectioned view of another form of control means of the device taken generally along line 7—7 in FIG. 6.

The instructional oscilloscope 10 as shown in FIGS. 1–3 basically comprises a cover housing 11 formed with louvered slots 12 therein along opposite side surfaces for the circulation of air through the housing. The chassis of the device includes a front wall portion 13 formed with a suitable aperture therein exposing the viewing screen portion 14 of a relatively large cathode ray tube 15 mounted in the housing. A protective transparent guard plate 16 is suitably mounted on the front wall portion 13 by fasteners 17 in covering relation with the screen portion 14 of the tube 15. The portion of the guard plate 16 directly overlying the visible screen area may be formed with suitable grid defining indicia as shown in FIG. 1.

The device 10 further includes a much smaller second cathode ray tube 18 mounted in the housing 11 and having a small screen portion 19 which is aligned with a suitable aperture in the rear wall portion 20 of the housing adjacent a top corner as shown in FIG. 2. The screen portion 19 is readily observable from behind the device 10 and associated therewith on the rear wall portion 20 are a plurality of control knobs and terminals permitting complete operation of the control circuit of the device which interconnects the tubes 15 and 18 for simultaneous identical operation. A substantial number of the control knobs and terminals accessible through the rear wall portion 20 constitute conventional means normally available with instructional oscilloscopes and, accordingly, only those controls which are of material importance to the present invention will be described. Such controls include the focus control knob 21, the intensity control knob 22, the vertical position control knob 23 and the horizontal position control knob 24. The other controls include, for example, an on-off switch 25, control knobs for gain, attenuation, and synchronous and sweep selection, the various terminals including A.C. input signal terminals, A.C. beam modulation input terminals, etc.

The basic mechanical features of the device 10 are best illustrated in FIGS. 4–7. All electrical leads and circuit components, with the exception of the cathode ray tubes 15 and 18 and certain potentiometers to be specified, have been deleted from the illustrations of FIGS. 4–7 to permit ready description of the basic mechanical features of the device. It will be understood that the circuitry and components thereof to be described below in connection with FIG. 8 are adapted to be compactly installed on the chassis in the cover housing 11 in any suitable manner as is well within the skill of the art.

The device 10 as illustrated in FIGS. 4 and 6 includes a chassis comprising the opposite end wall portions 13 and 20 and a bottom support plate 26 about which is received the cover housing 11 in releasable attachment therewith through any suitable means. The chassis includes a transverse intermediate wall portion 27 which extends vertically upwardly from the support plate 26 and is reinforced along opposite side margins with web plates 28. Centrally of the transverse wall portion 27 is an upwardly opening slot 29 from which extends an upwardly opening trough-like member 30 attached at one end to the transverse wall portion 27 and mounting a ring clamp 31 therein in alignment with the base portion of the slot 29. The outer end of the member 30 includes a frame-like member 32 surrounding the tubular base portion 33 of the large cathode ray tube 15. The base portion 33 extends through the ring clamp 31 which is tightened thereabout by suitable adjustment means 34, and projects through the base of the slot 29 beyond the wall portion 27. The members 30 and 32 have attached thereto a pair of reinforcing strips 35 which diverge outwardly along opposite sides of the tube 15 into suitable attachment with reinforcing webs 36 extending upwardly from the base plate 26 and in attachment with the wall portion 13. The ring clamp 31 mounts along the inner surface thereof a suitable annular cushioning member 37 (FIG. 6) which grips the tubular base portion 33 of the tube 15 in protecting clamping relation.

The smaller cathode ray tube 18 is also mounted in the transverse wall portion 27 in a similar manner but extends therefrom in a direction opposite to that of the larger tube 15. The wall portion 27 as best shown in FIG. 6 includes a vertically elongated portion along one side thereof which at the top thereof is formed with an upwardly opening slot 38 which is spaced vertically above the slot 29. The wall portion has attached thereto a similar trough-shaped member 39 which surrounds the base of the slot 38 and supports relative thereto a ring clamp 40 provided with adjustable clamping means 41 and an inner annular cushion member 42 received about the tubular base portion 43 of the smaller tube 18. The base portion 43 projects through the slot 38 to one side of the mounting arrangement of the larger tube 15. The screen end portion of the smaller tube 18 is suitably supported in the rear wall portion 20 of the device. The tubular base portions 33 and 43 of the respective tubes have suitable terminal blocks 44 and 45, respectively, connected therewith for circuit lead interconnection of the tubes.

With the arrangement described, the transverse wall portion 27 provides means which are readily available to accommodate opposite directional mounting of the tubes 15 and 18 in efficient and yet compact relation. Furthermore, the wall portion 27 subdivides the device 10 into prescribed tube operational areas thereby aiding in insulating the tubes from the operational temperatures of one another. The tube base enclosing members 30 and 39 further function to suitably insulate the adjacent base portions of the tubes from one another for operational protection. The particular manner in which the tubes are mounted in the chassis including the transverse wall portion 27 thereof permits ready tube installation and replacement without disturbing the remaining mechanical and electrical components of the device.

As shown in FIGS. 4 and 5, the rear wall portion 20 of the device carries the vertical position control knob 23 and the horizontal position control knob 24. Each of these knobs is connected to identical potentiometer operating units generally designated by the numeral 46 and located inwardly of the rear wall portion 20. As best shown in FIG. 5, each unit 46 includes a generally U-shaped bracket member 47 with the base thereof suitably fixed to the inner surface of the rear wall portion 20.

The innermost free ends of the leg portions of the bracket member 47 are interconnected by an insulating plate 48 mounting on the outer surface thereof a potentiometer 49. A rotatable operating shaft 50 of the potentiometer 49 is suitably rotatably journaled through the insulating plate 48 and is coupled with a knob shaft 51 through a sleeve coupler 52. Thus rotation of the knob 23 results in equal rotation of the operating shaft of the potentiometer 49. This potentiometer forms a part of a balancing bridge in the vertical deflection plate control circuit portion of the device and operates in the bridge in a manner to be described.

Mounted on the top leg portion of the bracket member 47 is another potentiometer 53 which includes a rotatable control shaft 54 suitably journaled through the bracket 47 and projecting upwardly therefrom with a slotted end exposed for ready engagement by a suitable tool for selective adjustment of the potentiometer 53. This potentiometer also forms a part of the aforementioned balancing bridge included in the vertical deflection plate control circuit portion to provide for pre-setting of the bridge and related circuit components for impedance balancing purposes as will be described. The remaining control unit 46 including the horizontal position control knob 24 is of similar construction and includes potentiometers 55 and 56 mounted in the same manner as the potentiometers 49 and 54 described above. The potentiometer 55 forms a part of the balancing bridge for the horizontal deflection plate control portion of the circuit and the potentiometer 56 provides pre-fixing or pre-setting means also constituting a part of the aforesaid balancing bridge. With each of the units 46 the insulating plate 48 provides means for electrically isolating the respective potentiometers thereof for efficient operation of these potentiometers in performing independent functions.

FIGS. 4, 6 and 7 illustrate a coupled control arrangement for the focus and intensity controls for each of the tubes 15 and 18 as operated by the single knob means 21 and 22 of FIG. 2. The focus control arrangement generally identified by the numeral 57 and the intensity control arrangement generally identified by the numeral 58 are identical in construction and operational arrangement and, accordingly, only the focus control arrangement 57 will be described in detail.

Referring particularly to FIG. 7, the focus control arrangement 57 includes a pair of potentiometers 59 and 60 each having as a part thereof externally threaded sleeve means 61 extending through an insulating plate 62, which plate is secured to the inner surface of the transverse wall portion 27 and extends over a pair of vertically spaced apertures 63 formed in the wall portion. Each sleeve 61 is secured in a suitable aperture in the insulating plate 62 by oppositely acting locking nut 64 and the potentiometer 59 includes a long operating shaft 65 extending through the various elements whereas the potentiometer 60 includes a shorter operating shaft 66 extending through the various elements.

Each shaft 65 and 66 receives thereon a sleeve-like spacer 67 which vertically aligns a pair of pulleys 68 fixed on the shafts. The shaft 65 extends beyond its pulley 68 and is coupled by a suitable sleeve connector 69 with the knob shaft 70 extending through the rear wall portion 20 with the knob 21 suitably attached thereto. Each pulley 68 along the outer periphery thereof is formed with inturned rounded flange portions 71 (FIG. 6) with the uppermost pulley receiving one end portion of a drive cord or belt means 72 through the outer peripheral opening thereof and reversely twisted over the shaft 65. The continuous pulley cord 72 extends downwardly about the lowermost pulley 68 and its opposite end portion extends through the aperture defined by the inturned flanges 71 into engagement with a tension spring 73 which is suitably secured at the opposite end thereof on the outer face of the lowermost pulley 68. The pulley cord 72 is readily releasable from the lowermost pulley 68 by reason of the spring attachment thereof to permit relative adjustment of the potentiometers 59 and 60 for purposes of pre-fixing or balancing of the oscilloscope 10. The spring tensioning of the pulley cord 72 about the coupled shafts 65 and 66 provides for immediate and equivalent operative response of the shafts upon operation of the single knob 21.

The potentiometers 59 and 60 of the focus control arrangement 57 form a part of the high voltage divider units of the individual tubes 15 and 18 as will be described below in connection with FIG. 8. For example, the potentiometer 59 may control the focusing of the larger tube 15 and the potentiometer 60 may control the focusing of the smaller tube 18. By reason of the fact that the tubes are operated at substantially different voltages, it is important that the mechanically coupled focus controls thereof be electrically isolated. Thus the mechanical coupling is brought about by the special mounting of the separate controls in the insulation panel 62 and by the coupling of the pulleys 68 through non-conducting cord means 72. In this manner close mechanical coupling is made possible and yet the substantial voltage differences involved in the operating circuits are separated from one another.

The intensity control arrangement 58 is of similar structure and is closely positioned to the focus control arrangement 57 for compactness of design. The same insulating plate 62 mounts the separate potentiometer elements of the intensity control arrangement 58 through suitable spaced apertures 74 (FIG. 6) in the transverse wall portion 27. The electrically isolated and mechanically coupled potentiometers of the intensity control arrangement 58 separately form parts of the high voltage divider units of the tubes 15 and 18 to control the intensity of operation of such tubes.

FIG. 8 schematically illustrates the novel aspects of the operating and control circuitry of the invention, conventional components being illustrated in block diagram form. As a preliminary to a description of the circuitry, it will be understood that the invention involves a composite arrangement of an A.C. resistance voltage divider and D.C. resistance bridge isolated by blocking capacitors for the simultaneous voltage division and centering control of a single A.C. input signal waveform which is simultaneously distributed to either the vertical or horizontal set of deflection plates of both cathode ray tubes 15 and 18, which for example, may constitute 12 inch and 3 inch tubes respectively.

An input terminal 75 forming a part of a conventional vertical pre-amplifier 76, which is suitably grounded to the chassis through a connection 77, provides means for supplying a signal or waveform to be displayed simultaneously on each of the tubes 15 and 18. The vertical pre-amplifier is connected through grids with a conventional amplifier tube 78, normally referred to as a deflection amplifier, having a pair of plates 78 and cathodes 80 which are grounded through a lead 81. Leads 82 from the amplifier plates 79 constitute deflection plate connections for deflection plates E and G of the larger tube 15. A D.C. resistance bridge 83 is connected across the plate leads 82, and to this extent the arrangement described is based on a conventional centering arrangement for the input signal of a single cathode ray tube. However, the vertical deflection plate control unit of the oscilloscope is designed for simultaneous control of the vertical deflection plates of the two tubes of substantially different size. To permit A.C. signal voltage division and D.C. operating voltage division in conjunction with simultaneous display centering, an A.C. resistance voltage divider 84 is connected across the amplifier plates 79 and leads 82. This voltage divider includes a plurality of resistors 85, 86, 87, and 88 with a center tap lead 89 connected between the resistors 86 and 87 and providing the D.C. operating voltage for the unit from a low voltage D.C. power supply 90.

Signal voltage division for operation of the vertical deflection plates A and B of the small tube 18 is provided by the connection of leads 91 between the resistors 85 and 86 and the resistors 87 and 88 of the divider 84. The leads 91 are connected across a leg 92 of the D.C. balancing bridge 83 between resistors 93 and 94 and between resistors 95 and 96 to similarly provide a proper D.C. operating voltage division for the vertical plates A and B of the small tube 18. Suitable blocking capacitors 97 are in the leads 82 and 91 between the A.C. divider 84 and the D.C. bridge 83 to prevent operational interference therebetween.

The D.C. balancing bridge 83 includes the potentiometer 53 previously described for the purpose of pre-fixed balancing of the voltage requirements of the various components of the device based on individual tolerance variations, this potentiometer forming a part of the leg 92 of the bridge. The bridge 83 further includes the leg 98 having as a part thereof the potentiometer 49 previously described to provide for bridge balancing control in obtaining simultaneous centering of the vertical component of the display signal on the screens of each of the tubes 15 and 18. The potentiometer 49 is a part of the circuit of the low voltage D.C. power supply 90, this portion of the circuit also including the horizontal centering control potentiometer 55 forming a part of a similar D.C. balancing bridge in the portion of the circuit controlling operation of the horizontal deflection plates of the tubes.

The horizontal deflection plate control unit of the device is basically identical to the vertical deflection plate control unit described above and, where applicable, similar reference numerals are used. This control unit includes a horizontal pre-amplifier 99 having a ground connection 100 and an imput connection 101 extending from a conventional sweep oscillator unit 102. The pre-amplifier 99 is connected with a conventional deflection amplifier tube 103 including the same cathode, grid and plate arrangement as previously described. Leads 104 extend to horizontal deflection plates H and J of the large tube 15 and divided down voltage leads 105 extend to the horizontal deflection plates C and D of the small tube 18. This portion of the circuit includes a similar A.C. divider 84 with the center tap 89 to the low voltage D.C. power supply 90, similar blocking capacitors 97, and a similar D.C. balancing bridge 83 including the potentiometer 55 and the component voltage balancing pre-fix potentiometer 56.

The remainder of the circuit includes a single conventional retrace blanking and external beam modulation amplifier unit 106 to which an external A.C. modulating beam is fed through a lead 107 from terminals or posts 108. The sweep oscillator unit 102 is operatively connected with the unit 106 through the input lead 109 in the conventional manner with the retrace blanking control signal being applied to the horizontal deflection plate control unit through the common lead 101. Leads 110 and 111 including blocking capacitors 112 and 113, respectively, impose the external beam modulation output of the unit 106 on input and control grids 114 and 115 of the tubes 15 and 18, respectively.

Each of the tubes 15 and 18 are basically operated in a conventional manner from a high voltage D.C. power supply 116 commonly connected to focus and intensity high voltage divider units 117 and 118 of the tubes 15 and 18 respectively. Each divider 117 is of known type and includes the appropriate potentiometers 59 and 60 of the focus and intensity control arrangements previously described. In this respect the high operating voltage supplied by the unit 116 is divided in the known manner through a conventional D.C. voltage divider (not shown) to selectively supply the requisite operating voltages for the various operating components of the tubes. As a pre-determined exact voltage division is involved in view of the manufacturer's ratings of the individual tubes, it is possible to use direct pre-set voltage division in this portion of the circuit and to mechanically couple the focus and intensity control potentiometers for simultaneous control of the different tubes. However, special mechanical coupling means of the type described above are preferably used in order to obtain efficient mechanical coupling action and yet maintain requisite voltage isolation in view of the substantial variance in operating voltages required by the different tubes. For example, a 12 inch tube 15 may require 3500 volts for operation of the post accelerator anode 119 which is not present in the 3 inch tube 18. The cathode 120 of the 12 inch tube 18 may operate under approximately 2500 volts whereas the cathode 121 of the 3 inch tube 18 may operate under approximately 1400 volts. Each tube further basically includes a focus control grid 122 and an astigmatic control 123.

In general, the plate load of each vertical deflection amplifier 78 and horizontal deflection amplifier 103 is divided by the respective A.C. dividers 84 to develop a low level signal for the deflection plates of the small tube 18. Similarly, the leg portion 92 of the D.C. balancing bridge 83 of each vertical and horizontal unit functions as a D.C. operating voltage divider as well as a part of the balancing bridge for both circuit component impedance matching and display signal centering on the screens of the respective tubes. Thus each D.C. balancing bridge not only operates to provide simultaneous and identical centering of the signal displays on the respective tubes but also provides deflection plate operating D.C. voltage division to maintain complete and accurate balance of the various voltages applied to the tubes of different size.

As is well known, the sweep oscillator unit 102 provides a voltage of sawtooth waveform of variable frequencies to sweep the beam spot across the tubes in operating the horizontal deflection plate control unit of the device. The combination retrace blanking and external beam modulating amplifier provides a signal of correct phase for utilization in the horizontal deflection plate control unit, which signal is synchronized with the sweep signal to blank out the waveform during retracing. This unit also supplies an external signal through the posts 108 to provide for beam modulation of the display signal on the tubes in the known manner.

The vertical pre-amplifier 76 amplifies any external signal fed to the device sufficiently to cover the vertical dimension of the screen of the larger tube, proper voltage division for the smaller tube and centering control for both tubes being provided by the divider 84 and bridge 83 forming a part of the vertical control unit. The horizontal pre-amplifier steps up the output of the sweep oscillator unit 102 to develop a signal of sufficient voltage for utilization of the entire large screen of the tube 15, with the voltage divider and balancing bridge portion of the horizontal deflection plate control unit appropriately accommodating the sweep oscillator output for simultaneous utilization in the small tube 18.

As is conventional, the low voltage D.C. power supply 90 functions to supply an adequate D.C. operating voltage to all plates of the various tubes and also supply the centering voltages for the bridges 83. The high voltage D.C. power supply 116 provides the requisite D.C. voltages for accelerating the electron screen in the large tube and for operation of the focus and intensity dividers of the two tubes for voltage division in operating the various tube grids, cathodes and anodes.

As an example of operation of the oscilloscope 10 of the invention, assuming the utilization of a 12 inch cathode ray tube monitored with a 3 inch cathode ray tube so that one input signal to the oscilloscope operates both cathode ray tubes simultaneously, a typical nominal sinewave input signal of 0.5 volt peak to peak may be used. Under such circumstances a gain of 2400 can be realized in the vertical pre-amplifier to produce a vertical deflection voltage of 1300 volts peak to peak across the vertical A.C. voltage divider 84. This total voltage is sufficient to cause approximately 10 inches of vertical deflection of the signal on the face of the 12 inch tube 15. By proper selection of the values of the resistors 85–88, a voltage division ratio of approximately 6 to 1 in the A.C. voltage divider 84 may be obtained. In this manner through the leads 91 it is possible to proportionately deflect the signal on the screen of the 3 inch cathode ray tube 18 coincidental to the degree of deflection of the same signal on the 12 inch cathode ray tube 15.

The sawtooth signal used to deflect the input signal horizontally on the screens of the tubes is a linear sweep signal produced in the conventional manner by the sweep oscillator unit 102 and supplied to the horizontal deflection plate control unit. The horizontal pre-amplifier may establish a gain of this signal of approximately 3000 to realize 1600 volts peak to peak across the horizontal D.C. voltage divider 84 so as to horizontally sweep the vertical display signal approximately 10 inches across the screen of the tube 15. Establishing a voltage division ratio in the horizontal A.C. voltage divider 84 of approximately 4 to 1 provides for a proportional sweeping of the input signal across the small tube 18 coincidental with the extent of sweeping occurring in the large tube 15. The conditions specified are based on full accelerating anode potentials as specified in the tube manual for 12 inch and 3 inch cathode ray tubes.

It is well known that one set of deflection plates of any cathode ray tube requires more deflection voltage than the other set. Furthermore, variable characteristics exist between two different types of cathode ray tubes, comparing for example, a post-acceleration type tube with a tube not having a post-accelerator. With these variables in mind, it will be understood that the resistance values of the various resistors of the control units are subject to variable selection for use under a given set of circumstances. In view of the voltage dividing and simultaneous centering operational aspects of the device 10 it would normally be impractical to even attempt to obtain an impedance match by hit or miss selection of components and values. However, the unique operational features of the present invention permits ready impedance matching of the operational components of the coupled tube circuits.

It has been found that impedance matching to a large extent occurs automatically when signal voltage division occurs. Voltage division is obtained with corresponding requisite decrease in operating impedance for the smaller tube while maintaining the higher value impedance necessary for the larger tube. In addition, proper component voltage matching is provided by utilization of the pre-fix potentiometers 53 and 56 in combination with the advantages obtained from voltage division. As a result of proper impedance matching, it is possible to utilize a single common amplified source for the purpose of retrace blanking and external beam modulation with two distinctly different cathode ray tubes and in a simultaneous and identical manner. Still further, only one active potentiometer is necessary in each of the vertical and horizontal centering controls for the manipulation of two separately displayed waveforms within the peripheral confines of screens of two individual cathode ray tubes of vastly differing size.

In the arrangement described, all of the controls are dual in function while simultaneously operating cathode ray tubes of different size. The dual characteristics of the focus and intensity controls and the centering controls have been described above. The gain for both the horizontal and vertical controls of the system can be operated by single controls as the dividers in the circuits automatically provide for appropriate gain application to the different tubes. Similarly, single controls for both tubes with regard to sweep selection and vernier, synchronous selection and lock, and horizontal and vertical attenuation may be utilized.

Obviously certain modifications and variations of the invention as hereinbefore set forth may be made without departing from the spirit and scope thereof, and therefore only such limitations should be imposed as are indicated in the appended claims.

We claim:

1. An instructional oscilloscope comprising a pair of viewing tubes operating at different voltages, single control circuit means for said tubes including a combination alternating current signal voltage divider and direct current operating voltage divider and balancing bridge in the deflection plate circuits of said tubes, and integrated tube display control means connected to each bridge for simultaneous and isolated control of the operation of said tubes, so that said tubes display similar traces.

2. Means for integrated operational control of the vertical and horizontal deflection plates of a pair of coupled cathode ray tubes of varying screen size operated from a single signal source, said means comprising a combination alternating current signal voltage divider and direct current operating bridge interconnecting vertical and horizontal deflection amplification means with the respective deflection plates of said tubes, each alternating current divider being connected across the output of said amplification means between leads extending to the deflection plates of a tube of larger screen size through terminals of said operating bridge, and stepped down voltage leads between said divider and bridge extending to the deflection plates of a tube of smaller screen size, whereby variation in bridge operating characteristics provides simultaneous centering control of the display signal of said tubes, so that said tubes display similar traces.

3. The means of claim 2 wherein each bridge is directly and proportionately coupled to a divider through said leads.

4. An operating and control circuit for a pair of larger and smaller screen size cathode ray tubes for simultaneous operation thereof, said circuit comprising single horizontal and vertical deflection plate control units coupled with both of said tubes, each deflection plate control unit including an amplifier tube and a combination alternating current signal voltage divider and direct current operating bridge across the plate leads of said amplifier tube extending to the deflection plates of the cathode ray tube of larger size, leads extending from said divider intermediate the terminals thereof and connected through said bridge to the counterpart deflection plates of the cathode ray tube of smaller size, and separate adjustable tap means forming a part of the bridges of said deflection plate control units for simultaneous centering of a signal display on said cathode ray tubes and for impedance balancing of the components of said circuit, so that said tubes display similar traces.

5. An operating and control circuit for a pair of larger and smaller screen size cathode ray tubes for simultaneous operation thereof, said circuit comprising single horizontal and vertical deflection plate control units coupled with both of said tubes, each deflection plate control unit coupled with both of said tubes, each deflection plate control unit including a pre-amplifier stage, an amplifier tube and a combination alternating current signal voltage divider and direct current operating bridge across the plate leads of said amplifier tube extending to the deflection plates of the cathode ray tube of larger size, leads extending from said divider intermediate the terminals thereof and connected through said bridge to the counterpart deflection plates of the cathode ray tube of smaller size, and blocking capacitors in said leads between each divider and bridge, a single low voltage direct current power supply connected to said deflection plate control units for operation thereof and for variation of the balance of each bridge thereof, a single high voltage direct current power supply connected to said cathode ray tubes, single sweep oscillator means in said circuit, single source retrace blanking and external beam modulation means in said circuit, and separate adjustable tap means forming a part of the bridges of said deflection plate control units for simultaneous centering of a signal display on said cathode ray tubes and for impedance balancing of the components of said circuit, so that said tubes display similar traces.

6. An instructional oscilloscope comprising a housing mounting therein a large screen cathode ray tube exposed along a front wall portion of said housing, a small screen cathode ray tube exposed along a rear wall portion of said housing, a unified operating circuit for said tubes in said housing and providing for simultaneous signal display on said screens, the operating voltage of said small screen tube being substantially less than the operating voltage of said large screen tube, and a control panel forming a part of the rear wall portion of said housing adjacent said small screen tube, said control panel including single focus and intensity control means forming a part of said unified circuit for simultaneous control of the operation of said tubes, each of said control means having a pair of adjacent shafts rotatably journaled in said housing and engagingly operating separate high and low voltage regulating means for said tubes, said journalling of said shafts including means electrically isolating said control means, one of said shafts projecting through said control panel for manual operating access, said shafts inwardly of said control panel being interconnected by coupling means for simultaneous rotation.

7. A multiple screen oscilloscope including a housing mounting therein cathode ray tubes of different screen size and operational voltages, means for dividing signal and operating voltages between said tubes for simultaneous single signal display thereby, and control means for said dividing means, said control means comprising a pair of potentiometer means each forming a part of separate tube operating circuit means and controlling tube operation under different voltage conditions, operating means for each of said potentiometer means extending through a wall portion of said housing and placing said potentiometer means in close association with one another, said wall portion including insulation means electrically isolating said potentiometer means and operating means, and coupling means interconnecting said operating means for simultaneous operation of both of said potentiometer means upon operation of one through its separate operating means, so that said tubes display similar traces.

8. The oscilloscope of claim 7 wherein said operating means are shafts journaled through said wall portion for rotation, one of said shafts including an operating knob accessible externally of said housing, said coupling means including pulleys mounted on said shafts and interconnected by non-conducting belt means.

9. The oscilloscope of claim 6 wherein said coupling means is in the form of pulleys mounted on said shafts, and is interconnected by electrical insulating belt means.

References Cited

UNITED STATES PATENTS

| 2,130,134 | 9/1938 | Tams | 324—121 |
| 2,584,175 | 2/1952 | Williams | 346—110 |
| 3,079,462 | 2/1963 | Rosenthal | 178—7.5 |

HERMAN KARL SAALBACH, *Primary Examiner.*

S. CHATMON, JR., *Assistant Examiner.*

UNITED STATES PATENT OFFICE
CERTIFICATE OF CORRECTION

Patent No. 3,330,988                      July 11, 1967

Richard E. Mueller et al.

It is hereby certified that error appears in the above numbered patent requiring correction and that the said Letters Patent should read as corrected below.

Column 5, line 56, for "78" read -- 79 --; line 59, for "E" read -- F --; column 7, line 16, before "123" insert -- grid --; column 10, line 66, for "Tams" read -- Iams --.

Signed and sealed this 22nd day of October 1968.

(SEAL)
Attest:

Edward M. Fletcher, Jr.                      EDWARD J. BRENNER
Attesting Officer                           . Commissioner of Patents